(12) United States Patent
Artiuch

(10) Patent No.: US 9,874,468 B2
(45) Date of Patent: Jan. 23, 2018

(54) SYSTEMS, DEVICES, AND METHODS FOR MEASURING AND PROCESSING FUEL METER MEASUREMENTS

(71) Applicant: Dresser, Inc., Houston, TX (US)

(72) Inventor: Roman L. Artiuch, Houston, TX (US)

(73) Assignee: Dresser, Inc., Houston, TX (US)

( * ) Notice: Subject to any disclaimer, the term of this patent is extended or adjusted under 35 U.S.C. 154(b) by 834 days.

(21) Appl. No.: 14/301,986

(22) Filed: Jun. 11, 2014

(65) Prior Publication Data

US 2014/0366643 A1 Dec. 18, 2014

Related U.S. Application Data

(60) Provisional application No. 61/835,497, filed on Jun. 14, 2013.

(51) Int. Cl.
*G01F 3/10* (2006.01)

(52) U.S. Cl.
CPC ..................................... *G01F 3/10* (2013.01)

(58) Field of Classification Search
CPC ................................ G01F 3/10; G01F 25/0053
See application file for complete search history.

(56) References Cited

U.S. PATENT DOCUMENTS

| | | | |
|---|---|---|---|
| 4,489,616 A * | 12/1984 | Priddy | G01F 1/06 210/87 |
| 5,455,781 A | 10/1995 | Reynal et al. | |
| 6,796,173 B1 | 9/2004 | Lajoie et al. | |
| 7,212,953 B1 | 5/2007 | Artiuch et al. | |
| 2007/0112536 A1* | 5/2007 | Artiuch | G01F 25/0053 702/100 |
| 2009/0187356 A1 | 7/2009 | Artiuch | |
| 2012/0000281 A1 | 1/2012 | Vo | |
| 2013/0218502 A1 | 8/2013 | Artiuch et al. | |

OTHER PUBLICATIONS

PCT Search Report and Written Opinion issued in connection with corresponding Application No. PCT/US2014042346 dated Sep. 29, 2014.
General Electric Oil & Gas. *Dresser Series C Rotary Meter: High Accuracy, Rangeability, and Resistance to Damage and Stress.* N.p.: General Electric Oil & Gas, 2012. Print.

* cited by examiner

*Primary Examiner* — Manuel L Barbee
(74) *Attorney, Agent, or Firm* — Mintz Levin Cohn Ferris Glovsky and Popeo, P.C.

(57) ABSTRACT

Systems, devices, and methods are provided for measuring and processing fuel meter measurements, such as rotary gas meter volume measurements, are generally disclosed herein. At least some aspects of the systems, devices, and methods can allow a fuel meter body to perform all processing regarding an amount of fuel dispensed from the fuel meter body and can allow the fuel meter body to provide results of the processing to an accessory configured to display data to a user. At least some aspects of the systems, devices, and methods can allow processing at the fuel meter body to be provided using one or more modules each configured to be removably and replaceably coupled to the fuel meter body.

17 Claims, 5 Drawing Sheets

SYSTEMS, DEVICES, AND METHODS FOR MEASURING AND PROCESSING FUEL METER MEASUREMENTS

CROSS REFERENCE

The present application claims priority to U.S. Provisional Application No. 61/835,497 entitled "Digital Meter Body Module For Rotary Gas Meter" filed Jun. 14, 2013, which is hereby incorporated by reference in its entirety.

FIELD

The subject matter disclosed herein relates to systems, devices, and methods for measuring and processing fuel meter measurements, such as rotary gas meter volume measurements.

BACKGROUND

Fuel dispensers that are used at gas stations for filling fuel tanks of motor vehicles commonly include an underground fuel tank, a pump unit, a flow meter, a hose, and an outlet nozzle. The pump unit pumps fuel from the underground tank creating a flow of fuel through the flow meter, the hose, and the outlet nozzle. In order to accurately track an amount of fuel remaining in the tank and to accurately determine how much to charge the user for the pumped fuel, the flow meter can measure an amount of fuel pumped through the outlet nozzle during a single pumping session, e.g., during a single user's fuel pumping.

If a dispute arises over a charge for fuel pumping, the fuel dispenser is typically checked for any malfunction. However, because the processor that calculates and displays the amount of pumped fuel is located outside the fuel dispenser, checking for malfunctions usually involves inspection of two different devices: the fuel dispenser and the accessory that includes the processor. It can be difficult to ensure that the same accessory and the same fuel dispenser used in a disputed fuel situation are connected and inspected in a way that accurately reflects their setup during the disputed fuel pumping. It can therefore be difficult to resolve the fuel pumping dispute. Similarly, it can be difficult for government inspectors to accurately and consistently inspect fuel dispensers and accessories when the pumping and the processing are in two different parts, and/or it can be difficult to properly time/date/amount log and not erase or otherwise lose fuel dispension records.

One example of a flow meter includes a rotary gas meter configured to mechanically transport a certain amount of gas with each rotation of the meter's impeller. Although the certain amount of gas is considered to always be the same with each rotation of the impeller in determining how much gas is pumped, the actual amount of gas that is transported by the meter can vary due to one or more external factors such as temperature and pressure. The actual amount of gas pumped can therefore be inaccurately determined because external factor(s) are not taken into account, thereby adversely affecting one or more parties such as consumers and gas station owners.

Accordingly, there remains a need for improved methods, systems, and devices for systems, devices, and methods for measuring and processing fuel meter measurements.

BRIEF DESCRIPTION

Methods, systems, and devices for measuring and processing fuel meter measurements are generally disclosed herein.

In one embodiment, a device is provided that includes an impeller configured to rotate to transport a volume of fuel, a sensor configured to sense a number of times the impeller rotates in a time period, and a processor configured to calculate a volume of fuel transported by the impeller based on the sensed number of times the impeller rotates in the time period. The processor can be configured to cause a digital signal indicating the calculated volume of fuel to be transmitted to a display that displays the calculated volume of fuel to a user.

In another aspect, a system is provided that in one embodiment includes a fuel meter body and an accessory. The fuel meter body can include an impeller configured to rotate to transport a volume of fuel, a sensor configured to sense a number of times the impeller rotates in a time period, and a processor configured to calculate a volume of fuel transported by the impeller based on the sensed number of times the impeller rotates in the time period. The accessory can be removably and replaceably coupled to the fuel meter body, can be configured to receive a digital signal from the fuel meter body indicating the calculated volume of fuel, and can be configured to display the calculated volume of fuel based on the received digital signal.

In another embodiment, a system is provided that includes a fuel meter body configured to determine an amount of fuel dispensed to a particular user and configured to transmit data regarding the determined amount, and an accessory configured to receive the transmitted data and to numerically display the amount of fuel without performing any digital processing on the received data.

In another embodiment, a system is provided that in one embodiment includes a fuel meter body and an accessory. The fuel meter body can include an impeller configured to rotate to transport a volume of fuel, a sensor configured to sense a number of times the impeller rotates in a time period, and a processor configured to calculate a volume of fuel transported by the impeller based on the sensed number of times the impeller rotates in the time period. The processor can be configured to cause a digital signal indicating the calculated volume of fuel to be transmitted to a display that displays the calculated volume of fuel to a user. The accessory can be removably and replaceably coupled to the fuel meter body, and the accessory can include the display such that the accessory receives the digital signal indicating the calculated volume of fuel, and the accessory.

In another embodiment, a system is provided that in one embodiment includes an accessory and a plurality of modular components. The accessory can be configured to provide an output indicating an amount of fuel dispensed from a fuel supply. Each of the modular components can be removably and replaceably attachable to the accessory such that any one of the modular components can be detached from the accessory without requiring removal of any of the other modular components. The modular components can include a first modular component configured to determine a pressure of the fuel and to transmit an indication of the sensed pressure to the accessory, a second modular component configured to determine a temperature of the fuel and to transmit an indication of the sensed temperature to the accessory, a third modular component configured to determine a composition of the fuel and to transmit an indication of the determined composition to the accessory, a fourth modular component configured to synchronize time to a standard time and to transmit an indication of standardized time to the accessory, and a fifth modular component configured to determine a volume of the fuel dispensed from the fuel supply.

In another aspect, a method is provided that in one embodiment includes sensing at a fuel meter body a number of times an impeller of a fuel meter rotates in a time period, calculating at the fuel meter body a volume of fuel transported by the impeller based on the sensed number of times the impeller rotates in the time period, causing a digital signal indicating the calculated volume of fuel to be transmitted from the fuel meter body to an accessory, and displaying at the accessory the calculated volume of fuel to a user.

In another embodiment, a method is provided that includes sensing at a fuel meter body a number of times an impeller of a fuel meter rotates in a time period, calculating at the fuel meter body a volume of fuel transported by the impeller based on the sensed number of times the impeller rotates in the time period, causing a digital signal indicating the calculated volume of fuel to be transmitted from the fuel meter body to an accessory that is removably and replaceably coupled to the fuel meter body, and displaying at the accessory the calculated volume of fuel to a user without performing any digital processing to determine the volume of the fuel or to determine a cost of the volume of the fuel.

In another embodiment, a method is provided that includes transmitting a digital signal indicating a pressure of a fuel from a first modular component removably and replaceably connected to an accessory, transmitting a digital signal indicating a temperature of the fuel from a second modular component removably and replaceably connected to the accessory, transmitting a digital signal indicating a composition of the fuel from a third modular component removably and replaceably connected to the accessory, transmitting a digital signal indicating standardized time from a fourth modular component removably and replaceably connected to the accessory, transmitting a digital signal indicating a dispensed volume of the fuel from a fifth modular component removably and replaceably connected to the accessory, calculating at the accessory an amount of the fuel dispensed, the calculating using the transmitted digital signals, and outputting an indication of the calculated amount of the fuel dispensed.

BRIEF DESCRIPTION OF THE DRAWING

These and other features will be more readily understood from the following detailed description taken in conjunction with the accompanying drawings, in which.

Figure 1:
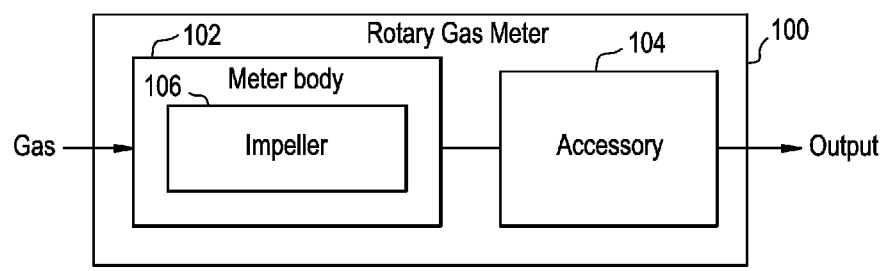
FIG. 1 is a schematic diagram of one embodiment of a gas meter including a meter body and an accessory.

It is noted that the drawings are not necessarily to scale. The drawings are intended to depict only typical aspects of the subject matter disclosed herein, and therefore should not be considered as limiting the scope of the disclosure.

DETAILED DESCRIPTION

Certain exemplary embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting exemplary embodiments and that the scope of the present invention is defined solely by the claims. In the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. The features illustrated or described in connection with one exemplary embodiment may be combined with the features of other embodiments. Such modifications and variations are intended to be included within the scope of the present invention.

Various exemplary systems, devices, and methods are provided for measuring and processing fuel meter measurements, such as rotary gas meter volume measurements. The systems, devices, and methods disclosed herein produce a number of advantages and/or technical effects.

At least some aspects of the systems, devices, and methods provided herein can allow a fuel meter body to perform all processing regarding an amount of fuel dispensed from the fuel meter body and can allow the fuel meter body to provide results of the processing to an accessory configured to display data to a user. In this way, the fuel meter body can be a self-contained processing unit. The data output to the accessory can be completely digital, e.g., without any analog processing signals, which can allow testing such as government inspection accuracy testing to be performed on a single device, e.g., the fuel meter body. Lacking processing capability related to calculating fuel dispension, the accessory cannot introduce error into the calculations and thus need not be subject to inspection with respect to such calculations, though as will be appreciated by a person skilled in the art, the accessory can be subject to some inspection as part of a regulated fuel system. In other words, all factors subject to inspection per government rules and regulations regarding fuel volume calculations can be self-contained at the fuel meter body such that the accessory that displays data regarding dispensed fuel need not be inspected with respect to fuel volume calculations. This can ease inspection by requiring inspection of only one device instead of multiple devices and without the possibility of multiple devices being connected together in a way that is not indicative of prior operating conditions, e.g., if two accessories are swapped between two different fuel meter bodies between inspections.

At least some aspects of the systems, devices, and methods provided herein can allow processing at the fuel meter body to be provided using one or more modules each configured to be removably and replaceably coupled to the fuel meter body. In this way, if any one or more components of any of the modules breaks, malfunctions, or otherwise needs attention and/or replacement, the one or more modules with the affected component(s) can be disabled and/or removed without affecting functionality of a remainder of the system. The modules can allow fuel meter bodies to be customized for different customers and/or for different applications by allowing any selected one or more of the modules to be removably and replaceably attached to a fuel meter body. The modules can allow each module to be individually approved under government regulations such that any one or more of the modules can be removed from a system and replaced with another one or more modules without any of the modules that are not removed and that have their own individual approvals being affected, from a government regulations perspective, due to the removal and replacement of the one or more modules. The modules can each include at least one hardware component (e.g., a sensor, an impeller, a memory, processor, etc.) and at least one software component (e.g., code to be executed by a processor). Alternatively, any one or more of the modules can be hardware-only and can be configured to communicate with a processor otherwise coupled to the fuel meter body, such as by being incorporated in the fuel meter body or being remotely located from the fuel meter body and accessible by, e.g., wireless communication. Being hardware-only can help reduce monetary cost of a module and/or can help reduce a size of the module so as to reduce an overall size of the fuel meter body and/or to free space for other fuel meter body components.

FIG. 1 illustrates an embodiment of a gas meter 100 configured to facilitate measuring and processing fuel meter measurements. The gas meter 100 in this illustrated embodiment is a rotary gas meter, but the gas meter 100 is not limited to use with rotary gas meters and can be similarly used with other fuel meters. Various examples of rotary gas meters and other types of fuel meters are discussed in U.S. Pat. Pub. No. 2009/0187356 entitled "Flow Meter Diagnostic Processing" filed Dec. 31, 2008, U.S. Pat. Pub. No. 2007/0112536 entitled "Measuring gas meter and volume corrector accuracy" filed Nov. 15, 2005, and U.S. Pat. Pub. No. 2012/0000281 entitled "Meter Devices and Methods" filed Jul. 2, 2010, which are hereby incorporated by reference in their entirety. One example of a rotary gas meter is the Dresser™ Series C Rotary Meter available from GE Oil & Gas of Houston, Tex. Similarly, although the illustrated meter 100 is for handling gas, similar meter can be used with other types of fuel.

The gas meter 100 in this illustrated embodiment includes a digital meter body 102 and an accessory 104. The accessory 104 can be fixedly attached to the digital meter body 102, e.g., integrally formed therewith, welded thereto, etc., or the accessory 104 can be removably and replaceably attached to the digital meter body 102, e.g., be a modular component.

The digital meter body 102 can include one or more impellers 106 configured to rotate so as to transport a known volume of gas input to the rotary gas meter 100 from an inlet of the digital meter body 102 to an output of the digital meter body 102. As will be appreciated by a person skilled in the art, the known volume of gas transported by the impeller(s) 106 can vary from meter to meter based on, e.g., meter body type and size of the meter body. The rotation of the impeller(s) 106 represents in analog form flowing of the gas. A number of the rotations corresponds to the volume of gas that passes through the meter body 102.

The digital meter body 102 can be configured to generate from the analog volume representation a digital signal (e.g., a number) indicating the volume of gas transported by the impeller(s) 106. In other words, the digital signal can represent the volume of gas that passed through the digital meter body 102, e.g., an amount of gas pumped by a user of a fuel dispenser that includes the meter 100.

The digital meter body 102 can be configured to transmit the digital signal to the accessory 104 in response to the accessory 104 transmitting a gas volume request to the digital meter body 102 Gas volume requests can be transmitted at regular intervals (e.g., every thirty seconds, every ten seconds, etc.), which can be set according to legal regulations. In some embodiments, the digital meter body 102 can transmit the digital signal to the accessory 104 without the accessory first transmitting the gas volume request.

The digital signal received by the accessory 104 can cause the accessory 104 to provide an output indicating the volume of gas. The output can be in a variety of forms, any one or more of which can be the output. Embodiments of the output include a displayed numerical value indicating the volume and a visual display of the volume (e.g., numbers, alphabetical characters, text, lights, images, etc., including any combination thereof). In some embodiments, the output can be digital, e.g., a digital numerical display, text and/or numbers on a screen, etc. In some embodiments, the output can be analog, e.g., a numerical value shown using mechanical gears that included numbers for display, a needle on a physical gauge, etc. The output in analog form can be, e.g., in a range of 4 to 20 mA.

The accessory 104 can thus be configured to provide an indication of a volume of gas without receiving and without processing any analog signals. Accordingly, accuracy testing of the meter 100 can be performed on the digital meter body 102 without needing to test the accessory 104, and even without knowing which specific accessory 104 was coupled to the digital meter body 102 during the time period subject to the testing in the case of a removable and replaceable accessory 104.

Figure 2:
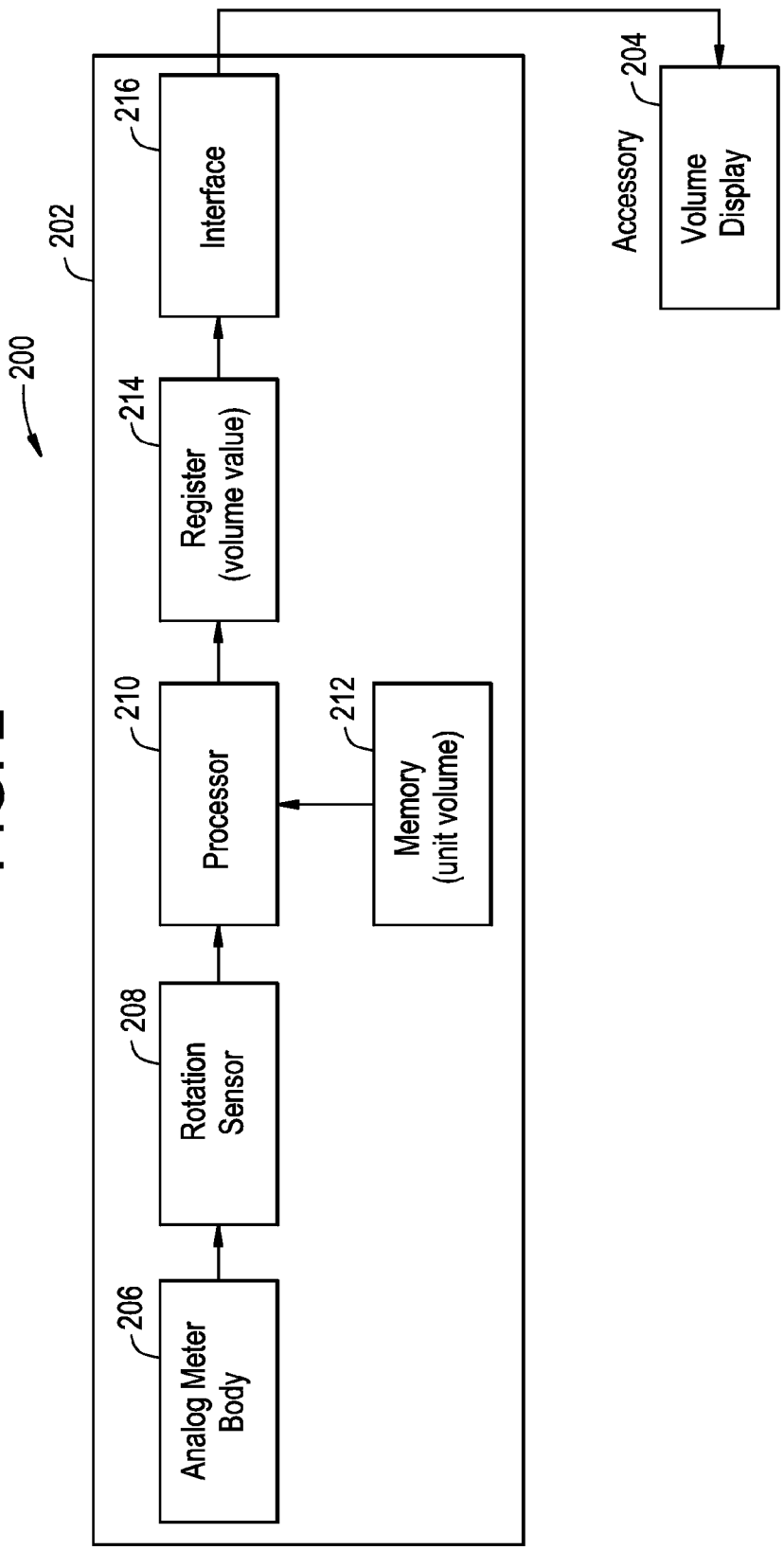
FIG. 2 is a schematic diagram of one embodiment of a digital meter body in a rotary gas meter, the digital meter body being configured to transmit a digital signal to an accessory configured to display a volume of gas dispensed by the rotary gas meter.

FIG. 2 illustrates another embodiment of a gas meter 200 configured to facilitate measuring and processing fuel meter measurements. Although FIG. 2 is described with reference to a rotary gas meter, the gas meter 200 is not limited to use with rotary gas meters and can be similarly used with other fuel meters.

The meter 200 in this illustrated embodiment includes a digital meter body 202 and an accessory 204. The digital meter body 202 can include an analog meter body 206 including one or more impellers (not shown) configured to rotate, one or more sensors 208 configured to sense the rotation of the one or more impellers, a processor 210 configured to process data, a memory 212 configured to store data, a register 214 configured to store data, and an interface 216 configured to facilitate communication with the accessory 204. The interface 216 in this illustrated embodiment is configured to facilitate communication from the meter body 202 to the accessory 204.

The one or more sensors 208 can be configured to transmit pulses regarding fuel volume transported by the one or more impellers of the analog meter body 206 to the processor 210. In one embodiment, the one or more sensors 208 can include at least one first sensor configured to sense forward rotation of the one or more impellers of the analog meter body 206 and can include at least one second sensor configured to sense reverse rotation of the one or more impellers of the analog meter body 206. In another embodiment, the one or more sensors 208 can include at least one passive rotation sensor configured to be activated upon rotation of the one or more impellers of the meter body 206.

The processor 210 can include any processing device, as will be appreciated by a person skilled in the art, such as a microprocessor, microcontroller, central processing unit (CPU), etc. The processor 210 can be configured to receive data indicating a characteristic of the meter body 202 from the memory 212, which has the characteristic data stored therein.

The memory 212 can include any type of storage unit, as will be appreciated by a person skilled in the art, such as random access memory (RAM). The memory 212 can store the characteristic data as one or more predetermined values specific to the meter body 202. One example of the characteristic data includes unit volume, which the processor 210 can use to calculate fuel volume by multiplying a number of impeller rotations by the unit volume. The unit volume can be unique to the particular impeller(s), as mentioned above. The number of impeller rotations can be detected by and received from the one or more sensors 208. If the one or more sensors 208 includes at least one first sensor configured to sense forward rotation of the one or more impellers includes at least one second sensor configured to sense reverse rotation of the one or more impellers, the calculation can take into account sensed measurements of both forward and reverse rotations, which can help provide a more accurate calculation than only considering forward rotation. Other examples of the characteristic data include static information related to the meter body 202, such as a number of impellers included in the analog meter body 206, a size of the one or more impellers, a serial number and/or other unique identification code that identifies the meter body 202, manufacturing data for the meter body 202, size of the meter body 202, type of the meter body 202, etc.

The processor 210 can be configured to transmit the calculated volume to the register 214, which can be configured to store the calculated volume. The register 214 can include any type of storage unit. The processor 210 can also be configured to transmit time/date information for each calculated volume, which can help create fuel dispension logs required by various government rules and regulations.

The interface 216 can be configured to retrieve stored data from the register 214 and can be configured to provide the retrieved data to the accessory 204 as digital data, e.g., as one or more digital signals, upon receipt of a request from the accessory 204. In some embodiments, the digital data can be provided to the accessory 204 without the accessory first requesting the data.

Similar to that discussed above, the accessory 204 can be configured to provide an output in response to receipt of the one or more digital signals from the meter body 202, with the output providing an indication of the volume of gas that passed through the analog meter body 206, e.g., the volume of gas that was dispensed by a user. As also discussed above, the output can have a variety of forms, e.g., a numerical value, etc.

The meter 200 can be configured to connect to an external power source (not shown), e.g., via wired plug connection, etc., configured to provide power to one or more of the meter body 206, the one or more sensor 208, the processor 210, the memory 212, the register 214, the interface 216, and the accessory 204. Alternatively or additionally, the meter 200 can include an on-board power supply configured to provide power to one or more of the meter body 206, the one or more sensor 208, the processor 210, the memory 212, the register 214, the interface 216, and the accessory 204. In an exemplary embodiment, the accessory 204 can include a first power source configured to provide power to the accessory 204, and the meter body 202 can include a second power source configured to provide power to the meter body 202. In this way, the accessory 204 can be configured to be detached from the meter body 202 without interrupting a power supply thereto and/or the accessory's power supply can be configured to provide less power than if it were powering both the accessory 204 and the meter body 202. In another exemplary embodiment, the accessory 204 can include a power source configured to provide power to the accessory 204 and to the meter body 202. In this way, if the power source is depleted and/or otherwise needs repair or replacement, the power source can be attended to without requiring any maintenance of the meter body 202, which can allow the meter body 202 to remain in service with another accessory (if the accessory 204 is configured to be removably and replaceably attached to the meter body 202 such that the other accessory can be attached thereto after removal of the accessory 204) and/or can avoid tinkering with the meter body 202, which can be a more complicated and/or more expensive device than the accessory 204.

Figure 3:
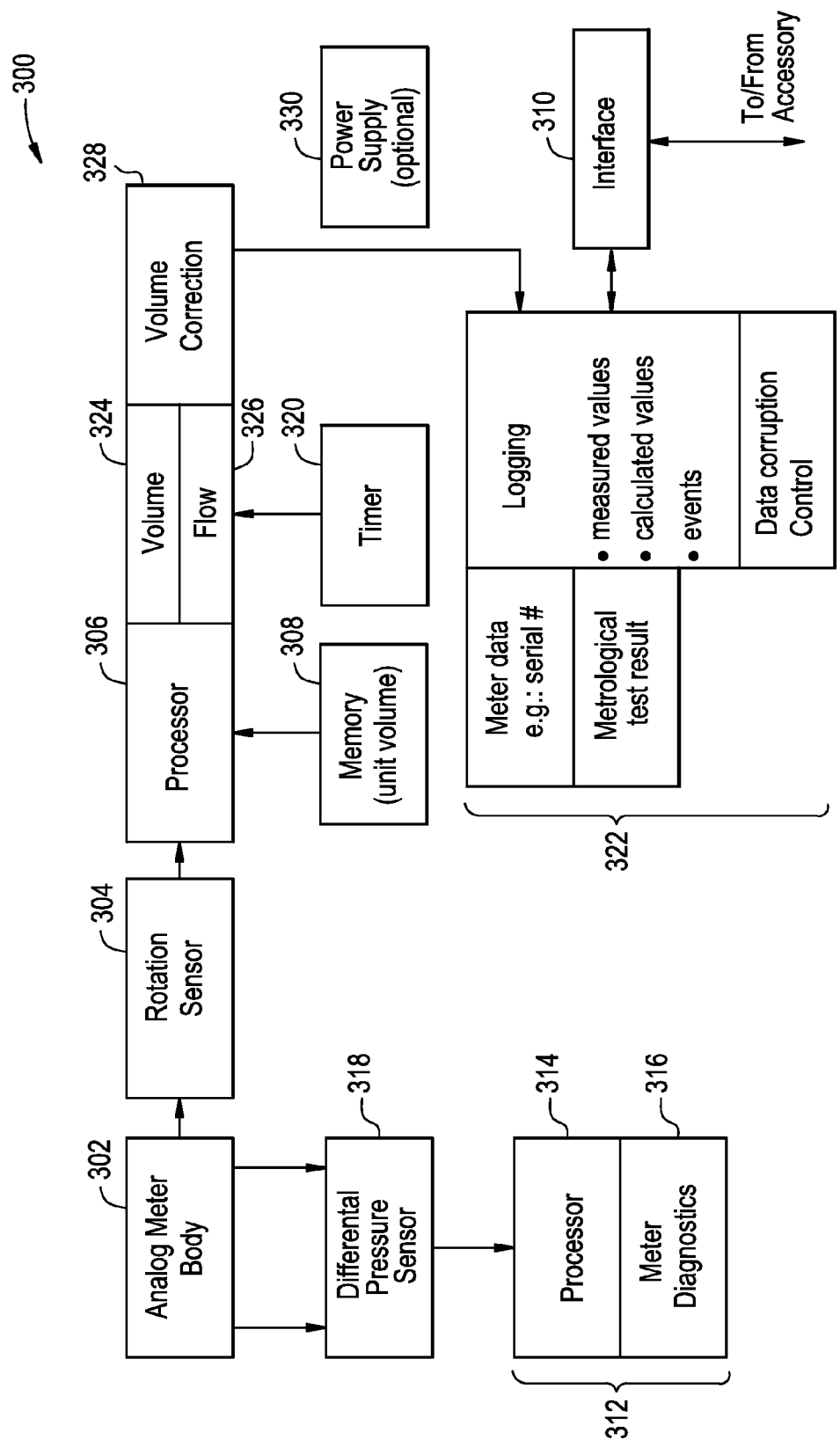
FIG. 3 is a schematic diagram of one embodiment of a digital meter body, the digital meter body being configured to transmit a digital signal to an accessory configured to display a volume of fuel dispensed by the meter body.

FIG. 3 illustrates another embodiment of a gas meter configured to facilitate measuring and processing fuel meter measurements. Although FIG. 3 is described with reference to a rotary gas meter, the gas meter is not limited to use with rotary gas meters and can be similarly used with other fuel meters.

The meter in this illustrated embodiment includes a digital meter body 300 and an accessory (not shown). The digital meter body 300 can be configured to transmit one or more digital signals to the accessory configured to provide an output in response to receipt of the one or more digital signals from the meter body 300. The digital meter body 300 can also be configured to transmit other types of signals, such as pulses. The digital meter body 300 can include an analog meter body 302 including one or more impellers (not shown) configured to rotate, one or more sensors 304 configured to sense the rotation of the one or more impellers, a first processor 306 configured to process data, a first memory 308 configured to store data, an interface 310 configured to facilitate communication with the accessory, a diagnostics system 312 that in this illustrated embodiment includes a second processor 314 and pre-stored meter diagnostic data 316, one or more differential pressure sensors 318 that can facilitate diagnostics testing of the analog meter body 302, one or more timers 320, and a second memory 322 configured to log data. In some embodiments, the first and second memories 308, 322 can be combined into one memory and/or split into additional memories.

The one or more timers 320 can be configured to synchronize time with the National Standard clock so as to allow accurate and consistent data gathered and/or calculated by the meter body 300 to be date and time stamped and/or to help gas tariffs to be accurately assessed since they can vary based on one or more factors (e.g., day of the week, time of day, holidays, etc.).

The first processor 306 can be configured to process volume data 324 and flow data 326 using timing data from the one or more timers 320 and using sensed data from the one or more sensors 304. The first processor 306 can be configured to instantaneously calculate the volume and the flow, which can allow the accessory to provide an indication of an amount of gas dispensed in an instantaneous manner so as to allow for prompt user payment for the gas dispension. The first processor 306 can also be configured to process volume correction data 328. The volume correction data 328 processed by the first processor 306 can allow for meter characteristic correction by correcting for flow, e.g., by compensating for low flow through the meter body 302, which can make the volume calculation more accurate.

The logging data stored in the second memory 322 can, e.g., facilitate testing of the meter body 300, review data sensed by the one or more differential pressure sensors 318 and/or data sensed by the one or more sensors 304, and/or review calculations performed by the first processor 306 and/or the second processor 314, etc. The logging data can be date/time stamped. In an exemplary embodiment, the logging data can include static information related to the meter body 300, metrological test results (which can include an accuracy curve), data corruption control information that can be configured to facilitate comparison of actual data with expected data, sensed or measured values, values calculated by the first processor 306, values calculated by the second processor 314, and sensed events. Examples of sensed events include faults and alarms. Examples of faults include flow above a maximum flow rate for the analog meter body 302, hardware problems (e.g., malfunction of the one or more sensors 304, malfunction of the one or more differential pressure sensors 318, malfunction of the first processor 306, malfunction of the second processor, malfunction of the memory 308, etc.), mechanical malfunctions (e.g., analog meter body 302 malfunctions, etc.), and data corruption that can indicate any differences between expected data and actual data. The maximum flow rate can be a predetermined value stored in the meter body 300 (e.g., in the memory 308, in the second memory 322, etc.), as the maximum flow rate can be different or different analog bodies depending on one or more factors such as fuel type, impeller type, impeller size, etc. Examples of alarms include flow rate outside required by user range and an indication of analog meter body 302 deterioration.

The interface 310 in this illustrated embodiment includes a bidirectional interface configured to facilitate two-way communication between the meter body 300 and the accessory. The interface 310 can be configured to provide data stored in the first memory 308 and/or the second memory 322 to the accessory, which can allow the accessory to display and/or otherwise output different types of information (e.g., gas volume information, notice of events, etc.).

In this illustrated embodiment, the meter body 300 includes an on-board power supply 330. However, as mentioned above, the meter body 300 can be configured to receive power from an external source and need not include an on-board power supply.

Figure 4:
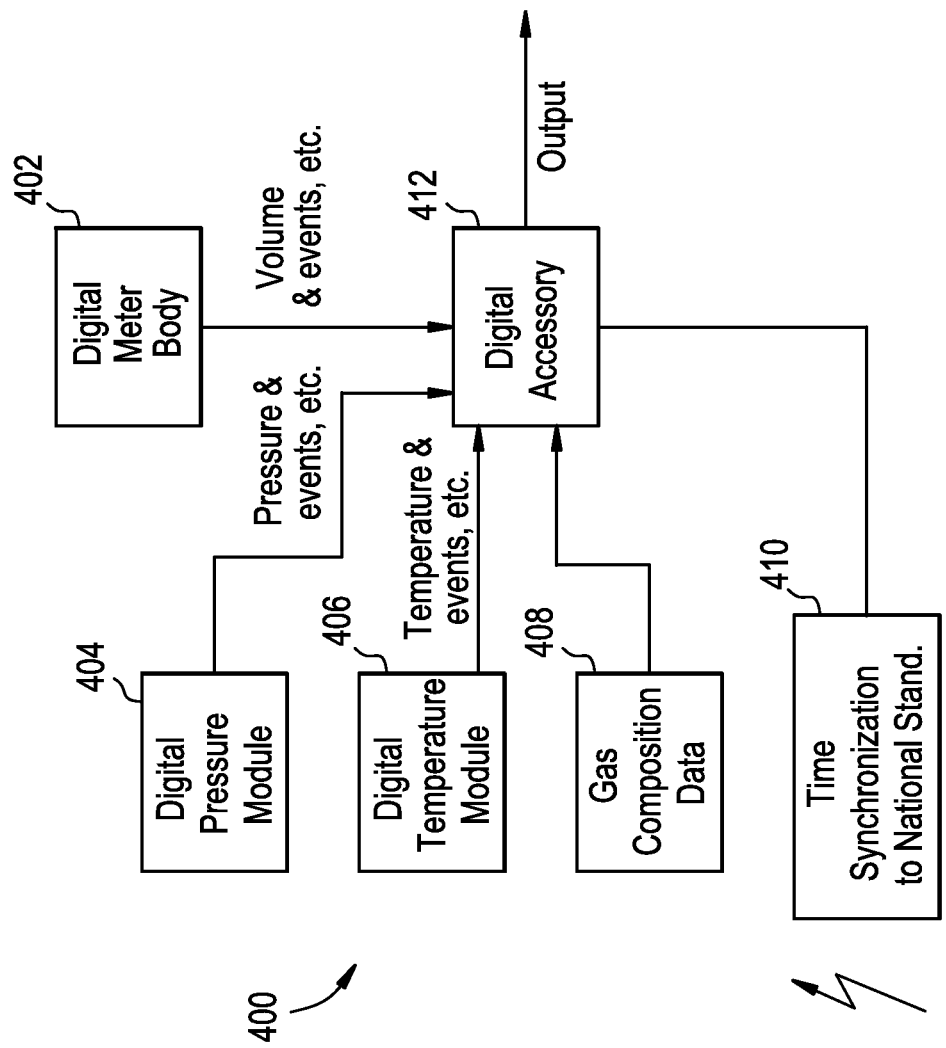
FIG. 4 is a schematic diagram of one embodiment of a metering system including a plurality of modules of a fuel meter body each configured to be replaceably and removably coupled to the meter body and each configured to provide a digital signal to an accessory configured to display information regarding fuel dispensed by the meter body.

FIG. 4 illustrates another embodiment of a gas meter 400 configured to facilitate measuring and processing fuel meter measurements. Although FIG. 4 is described with reference to a rotary gas meter, the gas meter 400 is not limited to use with rotary gas meters and can be similarly used with other fuel meters.

The gas meter 400 can include a meter body module 402, a pressure module 404, a temperature module 406, a gas composition module 408, a time synchronization module 410, and an accessory 412. Each of the meter body module 402, the pressure module 404, the temperature module 406, the gas composition module 408, and the time synchronization module 410 can be configured to transmit one or more digital signals to the accessory 412, which can be configured to provide an output in response to receipt of any one or more of the one or more digital signals. The modules 402, 404, 406, 408, 410 in this illustrated embodiment are digital, but the modules 402, 404, 406, 408, 410 can include any type of "smart" component having processing capability, e.g., a processor, microcontroller, CPU, etc. By being "smart," each of the modules 402, 404, 406, 408, 410 can be configured analyze data such that each of the modules 402, 404, 406, 408, 410 can be configured to not only transmit raw gathered data to the accessory 412 but to additionally or alternatively transmit analyzed data, such as to detect and to report sensed events (e.g., faults and alarms), and/or transmit static data, such as serial number data, etc.

The accessory 412 in this illustrated embodiment can be configured to receive digital data and not perform any analog processing and not perform any digital processing in order to provide the output except to the extent necessary to allow data to be output at all (e.g., to cause the data to be displayed on a display of the accessory 412, etc.). The accessory 412 can thus be configured to not introduce any metrological error because it processes only digital signals.

Figure 5:
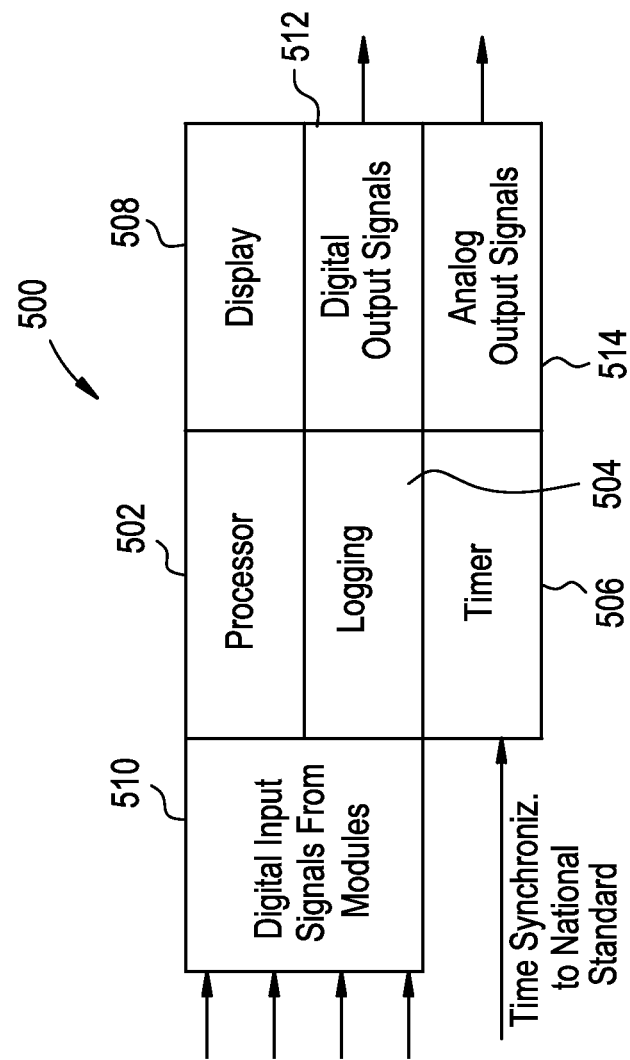
FIG. 5 is a schematic diagram of one embodiment of a digital accessory configured to display information regarding fuel dispensed by a fuel meter body.

In some embodiments, the accessory 412 can be configured to process digital data, without processing analog data (at least with respect to gas volume dispensed), as all analog processing can be performed at the modules. By only processing digital data, the accessory 412 can be configured to not introduce any metrological error because it processes only digital signals. Digital processing capability at the accessory 412 can allow the accessory 412 to correct volume data received from the meter body 402, e.g., to correct the volume data for accuracy based on one or more external factors, such that the accessory 412 can act as an integral volume compensator. The volume data from the meter body 402 can be corrected using data received from one or more other modules, e.g., the pressure module 404, the temperature module 406, the gas composition module 408, etc. One embodiment of an accessory configured to process digital data is shown in FIG. 5, which is discussed further below.

The accessory 412 can be involved with the storage of digital data received from any one or more of the modules 402, 404, 406, 408, 410, such as by being configured to store any of the received digital data in one or more storage units (not shown), e.g., one or more memories that are part of the meter 400, one or more registers that are part of the meter 400, etc. The accessory 412 being configured to store digital data from any one or more of the modules 402, 404, 406, 408, 410 can allow the one or more of the modules 402, 404, 406, 408, 410 that have data stored by the accessory 412 to be removed from the system without the data associated with (e.g., generated by, calculated by, transmitted from, etc.) with that module being lost due to that module's removal.

The gas meter 400 in this illustrated embodiment shows an example of a modular approach for fuel measurement. Each of the meter body module 402, the pressure module 404, the temperature module 406, the gas composition module 408, and the time synchronization module 410 can be configured to provide digital data to the accessory 412 that the accessory 412 can be configured to output (e.g., display as digital data for visualization by a user, etc.). Each of the meter body module 402, the pressure module 404, the temperature module 406, the gas composition module 408, and the time synchronization module 410 can be modular components that allows any one or more of the components to be removed from the system (e.g., to be detached from the accessory) and replaced without adversely affecting any of the other components. The same module that was removed from the system can be replaced therein, e.g., reconnected to the accessory, or a different module including the same or similar functionality can be added to the system, e.g., connected to the accessory, as a replacement for the removed module. In some embodiments, removed modules need not be replaced at all after being removed from the system. For example, the pressure and temperature modules can be removed from the system, and a single module having pressure and temperature capabilities can be added to the system. For another example, the pressure and temperature modules can be removed from the system, and the same pressure module can be reattached to the system and a different temperature module having a more sensitive temperature sensor can be added to the system.

The accessory 412 can be configured to log data regarding connection of a module thereto and detachment of a module therefrom. The data can be logged in a storage unit that is part of the accessory 412 and/or in an external storage unit. The data can be time/date stamped using data from the time synchronization module 410 and/or from a timer on board the accessory 412. By logging data regarding module connection and detachment, a history can be established of the meter's configuration, which can be helpful in evaluating efficiency of the meter 400, in helping to recreate certain meter setups, in inspections, etc.

The accessory 412 can be configured to communicate with module components attached thereto in a variety of ways, e.g., by using serial communication such as the Modbus protocol in which each of the modules has a unique address that facilitates communication therewith. In the illustrated embodiment, the accessory 412 is not configured to transmit data to any of the modules 402, 404, 406, 408, 410 connected thereto. In at least some other embodiments, two-way communication can be established with any one or more modules attached to the accessory 412 such that the accessory 412 can receive data from and transmit data to the one or more modules attached thereto. Being able to transmit data to module(s) connected thereto can allow the accessory 412 to transmit, e.g., a request signal requesting data from the module, a test signal to test the module for a fault, etc.

The pressure module 404 can be configured to sense pressure with one or more pressure sensors (not shown) and can be configured to determine if the sensed pressure is outside a predetermined normal pressure range, and if so, to transmit one or more signals to the accessory 412 indicating a fault and/or an alarm. The predetermined normal pressure range can be preprogrammed into the system, e.g., stored in a storage unit thereof. The predetermined normal pressure range can be reflective of the specific meter body 402 in use with the system since different meter bodies can have different acceptable pressure ranges and/or can be reflective of the specific fuel being processed by the system since different fuels can be subject to different acceptable pressure ranges. In response to receiving the one or more fault/alarm signals regarding pressure, the accessory 412 can be configured to store logging data indicative of the fault/alarm (e.g., a time/date of the fault/alarm, a type of the fault/alarm, measurement data related to the fault/alarm, etc.) in one or more storage units (not shown) and/or can be configured to provide an event notification output (e.g., sound an audible noise, shown a warning icon on a display, etc.) indicative of the sensed event. In some embodiments, the pressure module 404 can be configured to store the logging data indicative of the fault/alarm in the one or more storage units instead of or in addition to the accessory 412 storing the logging data. In some embodiments, the pressure module 404 can be configured to receive volume data from the meter body 402, which can allow the "smart" pressure module 404 to perform volume correction based on pressure. Various examples of pressure measurement systems that can be used as pressure modules are discussed in U.S. Pat. Pub. No. 2013/0218502 entitled "Temperature Compensated Pressure Transducer" filed Mar. 29, 2013, which is hereby incorporated by reference in its entirety.

The temperature module 406 can be configured to sense temperature with one or more temperature sensors (not shown) and can be configured to determine if the sensed temperature is outside a predetermined normal temperature range, and if so, to transmit one or more signals to the accessory 412 indicating a fault and/or an alarm. The predetermined normal temperature range can be preprogrammed into the system, e.g., stored in a storage unit thereof. The predetermined normal temperature range can be reflective of the specific meter body 402 in use with the system since different meter bodies can have different acceptable temperature ranges and/or can be reflective of the specific fuel being processed by the system since different fuels can be subject to different acceptable temperature ranges. In response to receiving the one or more fault/alarm signals regarding temperature, the accessory 412 can be configured to store logging data indicative of the fault/alarm (e.g., a time/date of the fault/alarm, a type of the fault/alarm, measurement data related to the fault/alarm, etc.) in one or more storage units (not shown) and/or can be configured to provide an notification output (e.g., sound an audible noise, shown a warning icon on a display, etc.) indicative of the sensed event. In some embodiments, the temperature module 406 can be configured to store the logging data indicative of the fault/alarm in the one or more storage units instead of or in addition to the accessory 412 storing the logging data. In some embodiments, the temperature module 406 can be configured to receive volume data from the meter body 402, which can allow the "smart" temperature module 406 to perform volume correction based on temperature.

The gas composition data module 408 can be configured to gather data regarding the composition of fuel being dispensed, which can be data required by various government rules and regulations. As mentioned above, fuel composition can be an external factor considered in determining actual amount of fuel dispensed. The gas composition module 408 can be configured to transmits one or more signals to the accessory 412 indicating a fault and/or an alarm, similar to that discussed above. In some embodiments, the gas composition data module 408 can be configured to receive volume data from the meter body 402, which can allow the "smart" gas composition data module 408 to perform volume correction based on fuel composition.

The time synchronization module 410 can be configured similar to the timers discussed herein so as to be time synchronized with the National Standard clock. The time synchronization module 410 can thus be configured to provide accurate and consistent date and time stamp data to the accessory 412, which can be useful in determining compliance with fuel tariffs assessed based on time of day, holidays, weekend days, etc. As with other timers discussed above, the time synchronization module 410 can be configured to transmits one or more signals to the accessory 412 indicating a fault and/or an alarm, similar to that discussed above. In some embodiments, the time synchronization module 410 can be a built-in feature of the accessory 412 so as to not be a module removable and replaceable therefrom. The accessory 412 having built-in timer capability can help ensure that the accessory 412 can always correct data with respect to time, e.g., to assess time-sensitive tariffs appropriately and accurately, since timer could not be removed from the accessory 412, unlike the time synchronization module 410. One embodiment of an accessory having built-in timer functionality is shown in FIG. 5, which is discussed further below.

The meter body 402 can be configured to provide fuel volume data for fuel dispensed within a time period, similar to the meter bodies discussed herein. As with other meter bodies discussed above, the meter body 402 can be configured to transmits one or more signals to the accessory 412 indicating a fault and/or an alarm, similar to that discussed above.

One embodiment of an accessory 500 configured to digitally process digital data is shown in FIG. 5. The accessory 500 can include one or more processors 502 configured to process data, one or more logging storage units 504 configured to store logging data, one or more timers 506 configured to synchronize time, one or more displays 508 configured to display data, one or more digital signal input elements 510 configured to receive digital signals (e.g., from any modules connected to the accessory 500, etc.), one or more digital signal output elements 512 configured to output digital signals from the accessory 500 (e.g., digital signals transmitted to a module connected to the accessory 500, digital signals indicative of compensated volume, etc.), and one or more analog signal output elements 514 (e.g., analog signals indicative of volume, etc.). The accessory 500 can be configured to be involved with the storage of digital data received from one or more modules, as discussed above, such as by storing data in the logging storage unit 504. The accessory 500 can be configured to process digital data, as discussed above, such as by using the processor 502.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device, comprising:
   an impeller configured to rotate to transport a volume of fluid;
   a sensor configured to sense a number of times the impeller rotates in a time period, wherein the sensor includes a first sensor configured to sense forward rotation of the impeller, and a second sensor configured to sense reverse rotation of the impeller; and
   a processor configured to calculate a volume of fluid transported by the impeller based on the sensed number of times the impeller rotates in the time period, the processor being configured to cause a digital signal indicating the calculated volume of fluid to be transmitted to a display that displays the calculated volume of fluid to a user.

2. The device of claim 1, wherein the processor is configured to cause the digital signal to be transmitted to the display in response to a fluid volume request.

3. The device of claim 2, further comprising a memory configured to store the calculated volume of fluid so as to store the calculated volume of fluid such that the processor accesses the stored calculated volume in response to the fluid volume request.

4. The device of claim 3, wherein the memory is configured to date and time stamp each of a plurality of volumes of fluid calculated by the processor so as to store a log of fluid volumes transported by the impeller.

5. The device of claim 1, wherein the processor is configured to determine based on the calculated volume of fluid whether or not a fault occurred in the transportation of the volume of fluid.

6. The device of claim 5, wherein the fault includes at least one of a mechanical failure, transportation of the fluid above a predetermined maximum flow value, transportation of the fluid below a predetermined minimum flow value, and data corruption.

7. The device of claim 1, further comprising a fluid meter body including the impeller, the sensor, and the processor; and
   a memory configured to store a predetermined unit volume of the fluid meter body, the processor being configured to calculate the volume of fluid also based on the predetermined unit volume.

8. The device of claim 1, wherein the device comprises a rotary fuel meter.

9. A system, comprising:
   a fluid meter body including the impeller, the sensor, and the processor of claim 1; and
   an accessory removably and replaceably coupled to the fluid meter body, wherein the accessory includes the display such that the accessory receives the digital signal indicating the calculated volume of fluid.

10. The system of claim 9, wherein the accessory is configured to display the calculated volume of fluid without performing any analog processing to determine the volume of the fluid or to determine a cost of the volume of the fluid.

11. The system of claim 9, wherein the processor is included in a first module that is separate from the accessory and that is removably and replaceably coupled to the accessory.

12. The system of claim 9, wherein the fluid meter body comprises a rotary fuel meter.

13. The system of claim 9, wherein the accessory includes a second processor that is configured to cause the calculated volume of fluid to be displayed without performing any analog processing.

14. A method, comprising:
   sensing at a fluid meter body a number of times an impeller of a fluid meter rotates in a time period, wherein the sensing includes a first sensor sensing forward rotation of the impeller, and a second sensor sensing reverse rotation of the impeller;
   calculating at the fluid meter body a volume of fluid transported by the impeller based on the sensed number of times the impeller rotates in the time period;
   causing a digital signal indicating the calculated volume of fluid to be transmitted from the fluid meter body to an accessory that is removably and replaceably coupled to the fluid meter body; and
   displaying at the accessory the calculated volume of fluid to a user without performing any analog processing to determine the volume of the fluid or to determine a cost of the volume of the fluid.

15. The method of claim 14, wherein the digital signal indicating the calculated volume of fluid is transmitted from the fluid meter body to the accessory without any analog processing signals being transmitted from the fluid meter body to the accessory.

16. The method of claim 15, wherein the accessory does not process any analog signals in displaying the calculated volume of the fluid.

17. The method of claim 14, wherein the accessory includes a display and a processor that processes the received digital signal to cause the calculated volume of fluid to be displayed on the display at the accessory.

* * * * *